A. Goodyear.
Turning Regular Forms.
No. 43,908. Patented Aug. 23, 1864.
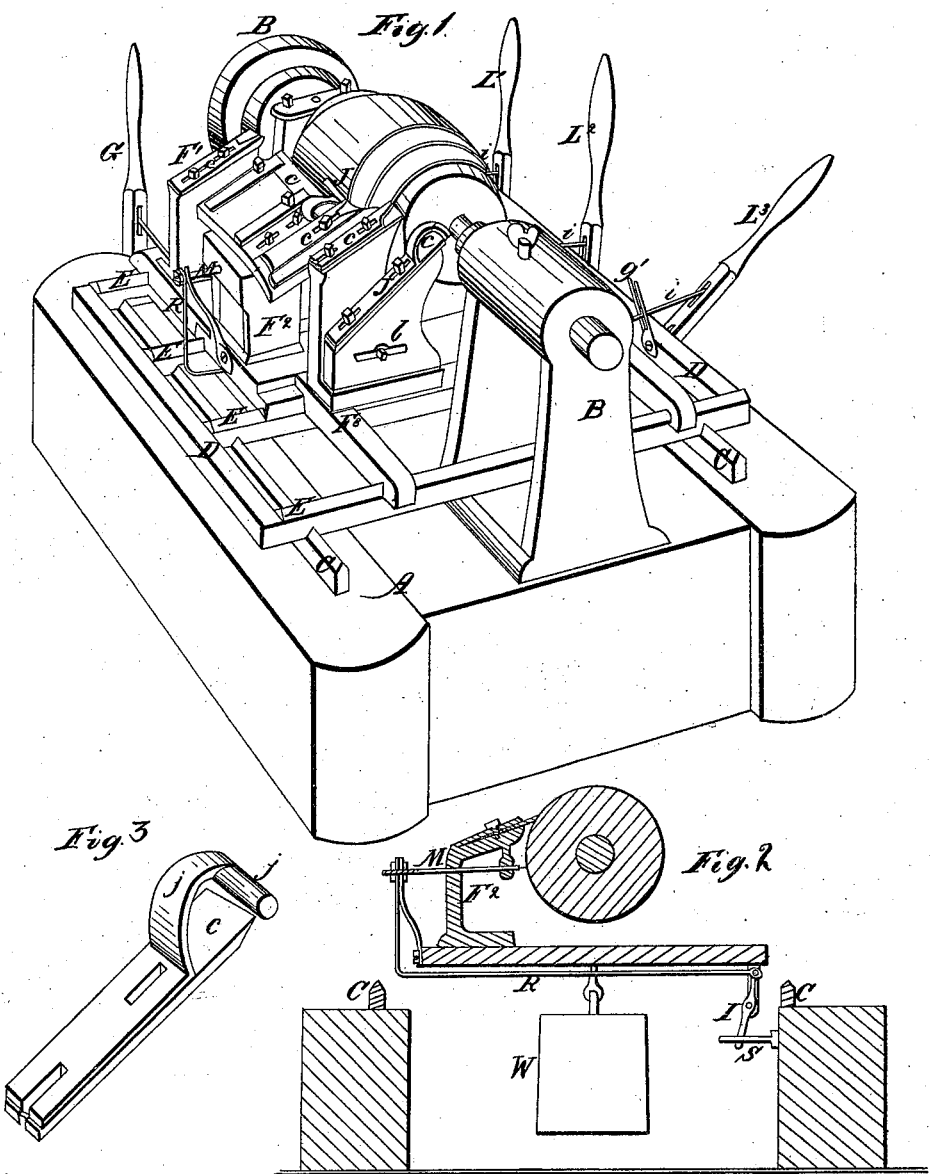
Witnesses
George Johnson
Dennis Goodyear
Inventor.
Andrew Goodyear

UNITED STATES PATENT OFFICE.

ANDREW GOODYEAR, OF SPRINGPORT, MICHIGAN.

IMPROVEMENT IN TURNING-LATHES.

Specification forming part of Letters Patent No. 43,908, dated August 23, 1864.

*To all whom it may concern:*

Be it known that I, ANDREW GOODYEAR, of the town of Springport, in the county of Jackson and State of Michigan, have invented a new and useful Improvement in Lathes for Turning Wheel-Hubs; and I do hereby declare that the following is a full, clear, and exact description of the construction and operation of the same, reference being had to the annexed drawings, making a part of this specification, in which—

Figure 1 is a perspective view; Fig. 2, a partial section in the line $x$. Fig. 3 exhibits one of the cutters and accompanying guide detached.

Similar letters of reference in all of the figures indicate corresponding parts.

This improvement consists in the use of a compound system of guides in connection with a series of carriages and rests, carrying cutters, and what I term "cutter-guides," by which the hub is reduced in sections to size and form; and the better to enable others skilled in the art to make and use this my invention, I will now proceed to describe it.

A represents the bed frame, which I usually construct of hard timber sufficiently massive to resist the effects of vibration, and afford a full bearing-surface for the two puppet-heads B B, which are secured by bolts permanently to the respective girts of the frame.

C C are two V-edged longitudinal guide-bars fastened to the upper sides of the frame A.

D D represent the sides, and E E E E the transverse bars, with V-shaped edges, of a rectangular frame, fitted to slide on the guide-bars C C, and said transverse bars are so arranged that the outer ones pass between the standards of the puppet-heads.

A series of carriages with attached cutter-rests (indicated at $F'$ $F^2$ $F^3$) slide upon the transverse guide-bars E E, &c., in corresponding indentations, and are moved back and forth thereon by means of the levers $L'$ $L^2$ $L^3$, which are hinged to the sliding frame and connected to the carriages by the rods $i$ $i$ $i$, the frame itself being adjusted longitudinally by the lever G in a similar way.

Slotted guides (one of which is seen at $g$) are attached to the sliding frame to steady the levers.

It will be seen by referring to Fig. 1 that each outer carriage-rest, though treated as one, consists actually of two separate rests, one of which is provided with set-bolts (not seen) for bearing-points to spread them apart when required, and the other is provided with a slot, through which a tightening-bolt, $b$, connects, so that the two different sets of cutters can have a varied relative adjustment to suit all sizes of hubs.

The cutters $c$ $c$ $c$, &c., are ground, fitted and adjusted to a pattern-hub, placed in the lathe, and one of the sides of the frame (marked D) is provided with screw set-bolts —one for each carriage—(not shown,) which are "set up" so that the carriages will strike against them when the hub is turned down to a finished size.

J J J represent what I term "cutter-guides," one of which accompanies each set of carriage-cutters. They are slotted as are the cutters for adjustment, and bolted above them to the rests.

The cutter-guide is exhibited clearly in Fig. 3. It is best made of steel, is arched at the end to confer some elasticity and allow the chips to escape freely, and as it is always bearing against the hub in turning, it is provided with a smooth bearing-pin, $j$, turned at a right angle. Its office is to govern the depth of the cut and prevent the cutters from taking too rank hold, by which the work might be spoiled.

I find that the best mode of adjusting the cutter-guide is to set it for a fine finishing cut by a moderate pull on the lever, for it must have sufficient spring to make the preliminary coarse cutting by a little additional force at the beginning.

The creases for the spokes are formed automatically by means of an adjustable screw-bolt S, screwed into the end of a lever, I, which bolt, when the hub is on the point of being finished, strikes by the movement of the carriage against the side of the bed-frame, and actuates a spring-rod, R, pivoted to the other end of the lever, which throws forward a marker, M, passing through the center rest, as may be clearly seen by referring to Fig. 2.

Each carriage is held down to its guides by a weight, W, suspended below, and it may be well to say here that for turning down the ends of the hub and in forming fillets in the moldings and band-places, I use additional cutters, (bolted over the surface-cutters,) which make a clean vertical cut.

I will now briefly describe the mode of operation. Everything having been adjusted to a pattern-hub, as described, I place the rough-cornered block, driven on a proper mandrel, between the puppet-heads, and by means of the lever G adjust the sliding frame so that the outside cutters will take off an equal amount, nearly, from each end of the block; then (having previously "roughed down" by a hand-tool to save the cutters) I bring down successively, while the block is revolving at a high speed, the levers $L'$ and $L^2$. These motions finish the ends and band places, while a movement of the center lever finishes the middle, including the moldings and crease-marks for the spokes, the whole occupying less than a minute, usually, and leaving the finished hub a perfect fac-simile of the pattern.

I am aware that the arrangement of my carriage rests and the mode of feeding my cutters up the work resemble in a general way the common engine-lathe for turning metals; but I do not know that wheel-hubs have ever been turned by sections with a series of carriage-rests and cutters in connection with any mode like mine of governing the cutters.

I therefore disclaim, broadly, turning revolving wheel-hubs by means of sliding rests having cutters attached; but, without confining myself to any specific division of the sections to be turned as herein stated,

What I claim as my invention, and desire to secure by Letters Patent, is—

1. The arrangement and combination of the sliding carriages and rests $F'$ $F^2$ $F^3$, cutters $c$ $c$ $c$, &c., sliding frame, (composed of the sides D D and transverse guide-bars E E E E,) and stationary guide-bars C C, arranged and operated in relation with the lathe proper substantially as and for the purposes herein described.

2. Combining with each set of the cutters $c$ $c$, &c., one or more of the cutter-guides J, as set forth.

3. Marking for the spoke creases automatically by the use of the lever I and screw-stop S, in combination with the spring-rod R and marker M, as specified.

ANDREW GOODYEAR.

Witnesses:
GEORGE JOHNSON,
DENNIS GOODYEAR.